(12) United States Patent
Buzzi

(10) Patent No.: US 8,256,239 B2
(45) Date of Patent: Sep. 4, 2012

(54) POWER UNIT FOR AIR CONDITIONING SYSTEMS INSTALLED ON BOATS

(75) Inventor: Fabio Buzzi, Annone Brianza (IT)

(73) Assignee: FB Design S.R.L., Annone Brianza (LC) (IT)

( * ) Notice: Subject to any disclaimer, the term of this patent is extended or adjusted under 35 U.S.C. 154(b) by 826 days.

(21) Appl. No.: 12/368,430

(22) Filed: Feb. 10, 2009

(65) Prior Publication Data

US 2010/0095694 A1 Apr. 22, 2010

(30) Foreign Application Priority Data

Feb. 22, 2008 (IT) .............................. MI2008A0292

(51) Int. Cl.
*F25B 27/00* (2006.01)
(52) U.S. Cl. ...................................... 62/323.1; 62/323.4
(58) Field of Classification Search .................... 62/239, 62/244, 323.3, 323.4, 498
See application file for complete search history.

(56) References Cited

U.S. PATENT DOCUMENTS

| | | | | | |
|---|---|---|---|---|---|
| 3,806,971 | A | * | 4/1974 | Elling | 114/348 |
| 3,987,748 | A | * | 10/1976 | Carroll | 440/11 |
| 4,177,648 | A | * | 12/1979 | Ohling | 62/73 |
| 4,442,786 | A | * | 4/1984 | Conners | 114/255 |
| 4,476,798 | A | * | 10/1984 | Backus | 114/77 R |
| 4,599,964 | A | * | 7/1986 | Kenney et al. | 114/124 |
| 4,922,724 | A | * | 5/1990 | Grayson et al. | 62/135 |
| 5,080,032 | A | * | 1/1992 | Giles | 114/271 |
| 5,129,343 | A | * | 7/1992 | Giles | 114/271 |
| 5,161,478 | A | * | 11/1992 | Strieb | 114/361 |
| 5,231,946 | A | * | 8/1993 | Giles | 114/56.1 |
| 5,832,856 | A | * | 11/1998 | Giles | 114/61.26 |
| 5,848,536 | A | * | 12/1998 | Dodge et al. | 62/240 |
| 5,989,084 | A | * | 11/1999 | Tsunoda et al. | 440/49 |
| 6,044,901 | A | * | 4/2000 | Basala | 165/122 |
| 6,047,942 | A | * | 4/2000 | Kennedy | 248/674 |
| 6,414,399 | B1 | * | 7/2002 | Bianchi | 290/1 A |
| 6,662,549 | B2 | * | 12/2003 | Burns | 60/204 |
| 6,701,733 | B2 | * | 3/2004 | Brunner | 62/240 |
| 6,916,161 | B2 | * | 7/2005 | Brunner et al. | 417/362 |
| 6,957,990 | B2 | * | 10/2005 | Lowe | 440/6 |
| 2001/0001363 | A1 | * | 5/2001 | Dodge et al. | 62/240 |
| 2001/0017335 | A1 | * | 8/2001 | Kutlucinar | 244/102 R |
| 2002/0017108 | A1 | * | 2/2002 | Schooley | 62/240 |
| 2003/0013356 | A1 | * | 1/2003 | Burns | 440/38 |
| 2003/0037757 | A1 | * | 2/2003 | Osband | 123/195 R |
| 2003/0164166 | A1 | * | 9/2003 | Takeuchi et al. | 123/674 |
| 2004/0007005 | A1 | * | 1/2004 | Brunner | 62/240 |
| 2004/0060321 | A1 | * | 4/2004 | Brunner et al. | 62/506 |
| 2004/0134858 | A1 | * | 7/2004 | Clukies | 210/691 |
| 2005/0064768 | A1 | * | 3/2005 | Lowe | 440/6 |

(Continued)

*Primary Examiner* — Mohammad Ali
(74) *Attorney, Agent, or Firm* — Hess Patent Law Firm PC; Robert J. Hess

(57) ABSTRACT

A power unit for air conditioning systems installed on boats, including at least one compressor, of the mass produced type used in the automobile industry, connected to the circuit of the refrigeration device, at least one mechanical pump for circulation of a heat exchange fluid along a circuit and one or more rotating electrical machines. Operation of the power unit is ensured during navigation by an internal combustion engine for marine propulsion, in particular a four stroke gasoline engine, with vertical motor axis, normally used for outboard marine propulsion, mass produced at low costs, while when the boat is in port it is ensured by an electric motor. The fan coils are also of the mass produced type used in the automobile industry.

17 Claims, 7 Drawing Sheets

U.S. PATENT DOCUMENTS

| | | |
|---|---|---|
| 2005/0204610 A1* | 9/2005 | Bogart et al. ..................... 43/55 |
| 2005/0236013 A1* | 10/2005 | Huston et al. ..................... 134/1 |
| 2006/0055173 A1* | 3/2006 | Gianfranco .................. 290/1 B |
| 2006/0234566 A1* | 10/2006 | Ando ................................ 440/1 |
| 2007/0145745 A1* | 6/2007 | Woods et al. ................. 290/1 A |
| 2008/0029014 A1* | 2/2008 | Giles ............................ 114/289 |

* cited by examiner

POWER UNIT FOR AIR CONDITIONING SYSTEMS INSTALLED ON BOATS

BACKGROUND OF THE INVENTION

1. Field of the Invention

The present invention relates to a power unit for air conditioning systems principally intended for installation on boats.

2. Discussion of Related Art

The air conditioning system is a common system on board of cabin cruisers, also of medium-small size, and is now considered essential by almost all boat owners, at least in hotter areas of the world.

Depending on the type of boat, systems having different concepts can be used. However, even for the smallest boats (i.e. with only one room to be cooled) the energy source remains the electrical current, which is generated by a generator set or by the shore power line if the boat is in port. This activates an electric motor, which drives the compressor of the cooling device.

In the case of boats of larger dimensions, with more than one room (or cabin) to be cooled, centralized systems are installed. These can be of two types: with direct distribution of coolant gas to the evaporators or with circulation of treated water, i.e. previously cooled by a refrigeration device through a heat exchanger, sent to one or more fan coils.

In any case, all air conditioning systems available on the market require the presence of a generator set capable of supplying the necessary power for an electrically operated compressor.

In fact, in air conditioning systems installed on boats, the compressor is a device operated by an electric motor, which, owing to the fact that it can also be powered directly by the shore power network, requires an alternating current power supply.

The rated installed power of the compressor (conventionally indicated with the unit of measure BTU/h) depends on the size of the system, i.e. on its characteristic parameters, namely the volume to be cooled, the difference in temperature to be imparted and the coolant fluid used (i.e. its specific heat).

The electrical power required by the compressor motor, as already mentioned, is normally supplied by the electric generator of a generator set installed for this purpose, which must also supply the accessories of the system, such as the water circulation pumps and the fan coil fans. Alternatively, when the boat is moored in an appropriately equipped port, the power supply to the compressor motor and to the aforesaid accessories can be provided by the shore power network.

Nonetheless, due to the high cost and considerable weight, a generator set capable of supplying utilities with alternating current is rarely present on small and medium sized pleasure boats, where the on board batteries charged by the alternators of the main motors are generally sufficient.

SUMMARY OF THE INVENTION

From the above, it is possible to identify the limits for installation of air conditioning systems in small and medium sized boats: increase in cost, weight and overall dimensions of the generator set, such as to also considerably influence the performance of boats.

In general, the task of the present invention is to propose a power unit for air conditioning systems installed on boats, which allows the limits of prior art to be overcome.

Within this task, an object of the present invention is to propose a power unit of the type mentioned above which has a particularly low cost.

Another object of the present invention is to propose a power unit of the type mentioned above which allows combination therein of all the functions required to ensure operation of an air conditioning system both during navigation and while the boat on which it is installed is in port.

A further object of the present invention is to propose a power unit of the type mentioned above capable of providing other functions, for example functions useful in the event of an emergency.

Yet another object of the present invention is to propose a power unit of the type mentioned above which can be installed without distinction on boats propelled by gasoline engines or by diesel engines.

These objects are achieved by means of the present invention which relates to a power unit for air conditioning systems installed on boats, including at least one drive motor and means to drive the components of the unit in rotation, for example including at least one compressor connected to the circuit of a refrigeration device, at least one mechanical pump for circulation of a heat exchange fluid along a circuit and one or more rotating electrical machines.

According to the present invention, the components of the power unit are advantageously operated by an internal combustion engine for marine propulsion, thus suitable to be cooled with seawater.

Besides allowing a noteworthy reduction in weight and costs with respect to prior art solutions, the power unit according to the invention is advantageous as the accessories required for operation of the system are all mechanically operated, eliminating the electrical phase, with consequent improvement of the global efficiency of the system, through saving of an energy transformation step.

A further advantage, in the case of boats provided with outboard or inboard-outboard gasoline engines is the availability of the same type of fuel, supplied by the boat's tanks.

The solution of the present invention is also advantageous from the viewpoint of costs. In fact, the power unit uses, in a new way, a type of four stroke engine, mass-produced at limited costs, light and already designed to operate in water, and thus suitable to be cooled directly with fresh water or seawater and which, by virtue of the most recent anti-pollution regulations, respects the environment. By eliminating the need to generate current it is possible to obtain greater outputs with considerable savings in weight.

No modifications are made to the circulation systems of the coolant fluid present in the circuit of the refrigeration device, or to the circuit for circulation of cooled water, nor, for example, is the use of new heat exchange means introduced, with respect to those already known in the state of the art.

The present invention instead allows elimination of the generator set to operate the electric compressor, replacing it with a mechanically operated one, with the same rated power, for example a compressor of automobile origin, thus eliminating a step in the thermodynamic chain. In fact, the "electrical" phase is no longer used to compress the gas.

The mechanical compressor is thus operated by an internal combustion engine for marine propulsion, preferably with a four-stroke cycle, and it is preferably a gasoline-fuelled engine, although it would also be possible to use a diesel-fuelled engine.

Advantageously, marine propulsion engines of the type normally mass-produced can be used, such as outboard engines with powers up to 30 HP. It would obviously be possible also to apply the idea to systems that require greater powers, for example in the case in which it is necessary to install the power unit on larger boats with respect to those for which the present invention has been conceived.

In the power unit according to the invention, all the components are operated simultaneously by the internal combustion engine. The transmission of motion can, for example, be obtained through one or more drive belts, stretched between the pulleys connected to this engine, to the compressor, to the mechanical pump and to the rotating electrical machines.

For example, according to a possible embodiment, the components of the power unit can include:

an internal combustion engine, fuelled by gasoline or diesel;

a mechanical compressor for air conditioning systems, such as a compressor normally used in the automobile industry;

a mechanical pump for circulation of the heat exchange fluid, for example seawater;

an alternator for generating the current intended to supply the fan coils and other devices or circuits which require electrical power when the internal combustion engine is operated during navigation;

an alternating current electric motor to operate the unit, in place of the internal combustion engine, during periods in which the boat is in port; and a mechanical pump for circulation of the carrier fluid, such as distilled water with additives, along a closed circuit.

The insertion of an alternator in the power unit between the utilities driven by the belt and operated by the internal combustion engine allows transformation of part of the mechanical energy into electrical energy to contribute toward charging the batteries which, in turn, power the fans of the fan coil.

The alternator, of adequate size, can for example be of the same type already used on propulsion engines for boats. In the case of breakdown of the main electrical system, it can provide a further safety element, also due to the provision for manual starting typical of gasoline-fuelled engines, especially those for outboard propulsion.

Alternatively, a rotating electrical machine of reversible type can be provided, which can operate as an electric motor when it receives electrical power while the boat is in port, or as an electrical current generator when it is driven in rotation by the internal combustion engine during navigation.

As mentioned, the limits to the use of air conditioning systems while in port are the noise of the generators, although silenced and contained in sound-proofed boxes, and the emission of fumes into the atmosphere. The presence of an alternating current electric motor allows operation of the unit also while the boat is in port without producing polluting emissions.

In fact, mooring in port allows access to the shore power network as an energy source and therefore the electric motor can be supplied using a socket and connection cable. The power required for operating the compressor, seawater circulation pump and alternator is thus supplied by the electric motor, reducing noise completely and eliminating emissions of polluting gases. Only the water circulating in the heat exchanger to be cooled by the coolant gas will be discharged while the boat is in port.

To ensure operation of the unit by the electric motor, the internal combustion engine will preferably be provided with an electromagnetic clutch or with a freewheel mechanism to prevent it from rotating when the power is supplied by the electric motor. This latter, in turn, if necessary can be provided with a freewheel mechanism to prevent rotation of the shaft when the power is supplied by the internal combustion engine.

The gas compressor can advantageously be of the type used in the automobile industry as it is particularly suitable for small-medium sized boats, mainly operated by gasoline engines, and allows economies of scale through mass production.

The water circulation pump can advantageously be employed to provide different functions. Firstly, the pump provides the water for the cooling circuit of the engine (as already provided for a conventional outboard engine that draws water through a pump) and, secondly, it supplies the cooling circuit of the coolant gas in countercurrent.

Moreover, the pump can also perform the function of emergency pump. In fact, by providing a three-way valve or cock, instead of drawing from a water intake passing through the hull, the pump can draw directly from the engine room (or also from another compartment or room, depending on installation of the system) and thus be used as emergency bilge pump.

All components of the power unit can be mounted in a compact form on a single flat support plate. The components can also be closed in a box, made of moulded plastic, fibreglass or another suitable material, coated internally with a sound-damping material. The flat support plate can also form a wall of the box.

The box is in any case provided with openings for air intake, passages for the fuel supply pipes, passages for the coolant fluid circulation circuit pipes, and passages for the water circulation circuit and for discharge of the exhaust gases produced by the internal combustion engine. If water is to be used as circulating medium, the heat exchanger for exchange between the coolant fluid of the refrigeration device and the water sent to the fan coils can also be mounted on the plate, and therefore this component can also be enclosed inside the box.

BRIEF DESCRIPTION OF THE DRAWING

Further advantages and characteristics of the present invention will be apparent from the description below, provided with reference to the drawings attached by way of non-limiting example, wherein.

DETAILED DESCRIPTION OF THE PREFERRED EMBODIMENT

Figure 1:
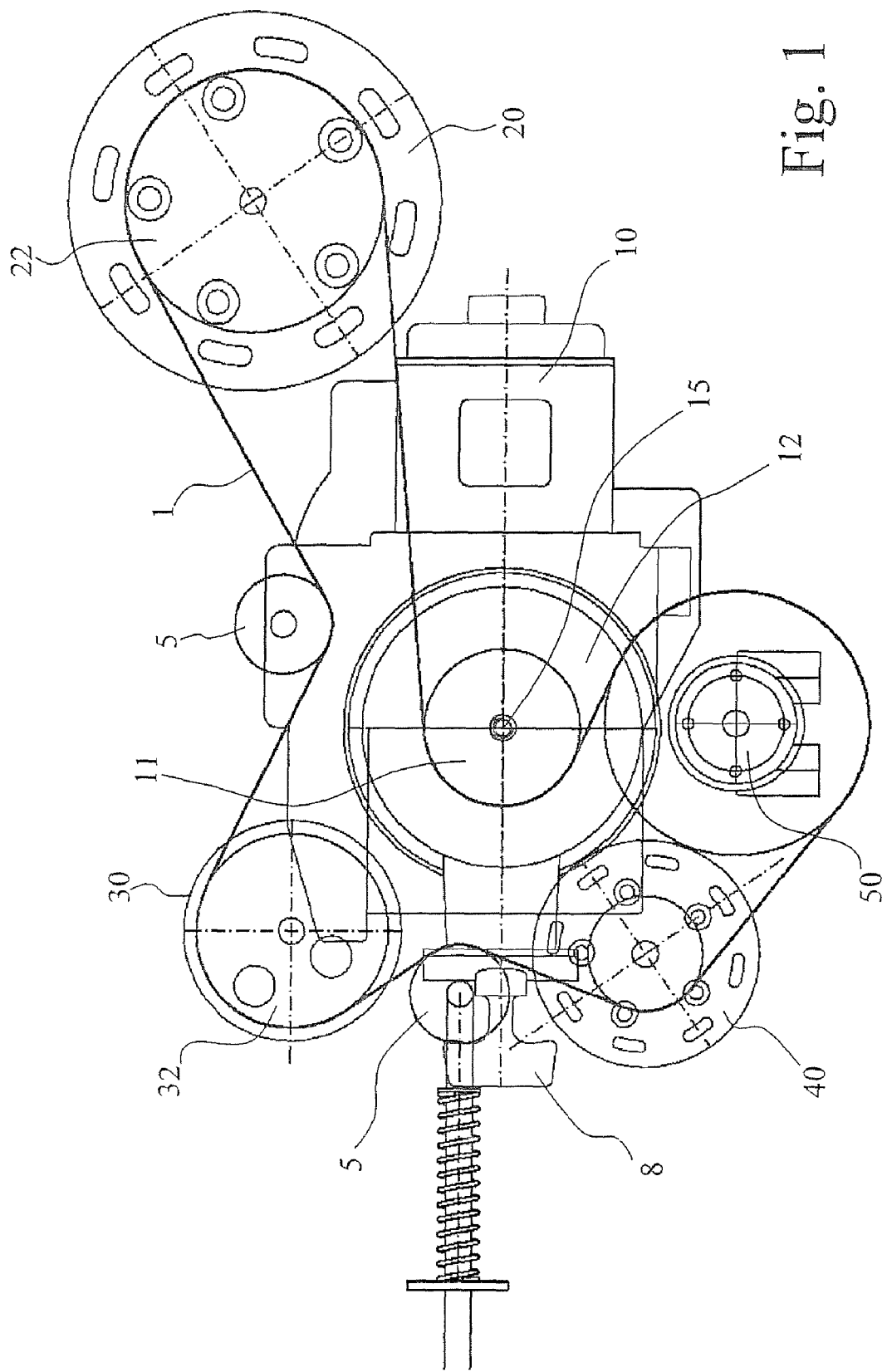
FIG. 1 shows a schematic view of the components of a power unit according to a possible embodiment, which provides for the use of a gasoline-fuelled internal combustion engine.

The embodiment shown in FIG. 1 provides for a power unit in which an internal combustion engine 10 is installed, preferably with four-stroke cycle, gasoline-fuelled and intended for marine propulsion.

On the shaft 15 of the internal combustion engine 10 a pulley 11 is connected, which drives a belt 1 connected to the pulleys of the components of the power unit.

Connection between the pulley 11 and the shaft 15 is preferably obtained through a freewheel mechanism 12 to prevent the engine 10 from being driven in rotation when the unit is operated by the electric motor 20.

A freewheel mechanism 22 can also be provided for the electric motor 20, to prevent it from being driven in rotation when the unit is operated by the engine 10. In fact, the alternating current electric motor 20 allows operation of the unit, in place of the internal combustion engine, while the boat is in port.

The compressor 30 is preferably a mechanical compressor for air conditioning systems, for example a compressor normally used in the automobile industry. The compressor 30 is preferably equipped with an electromagnetic clutch capable of activating/deactivating, in a controlled manner, the driving in rotation thereof by the belt 1 under the action of the internal combustion engine 10 or of the electric motor 20. The electromagnetic clutch of the compressor will be controlled by a control system of the air conditioning system, which will connect and/or disconnect the compressor on the basis of the operating parameters of this system.

The alternator 40 is preferably of the type already used in propulsion engines for boats, generally of automobile origin. The alternator 40 allows part of the mechanical energy produced by the engine 10 to be transformed into electrical energy, in order to contribute toward charging the batteries, which, in turn, will supply devices and circuits which require electrical power, for example the fans of the fan coils. The batteries charged by the alternator 40 can also be used in the event of an emergency, also to start the propulsion engine of the boat. It is also possible to use this motor as an electric generator when the combustion engine is activated.

The mechanical pump 50 is essentially used for water circulation in the cooling circuit of the internal combustion engine 10, as already provided, for example, for a conventional outboard engine which draws water through a pump, and to supply a heat exchanger with the water and the gas circulating in the refrigeration device in countercurrent. Mechanically or hydraulically operated belt tensioner rollers 5 are appropriately disposed along the path of the belt 1.

The embodiment of FIG. 1 also shows a member 8 for manual starting of the internal combustion engine 10, generally provided on outboard propulsion engines.

Figure 2:
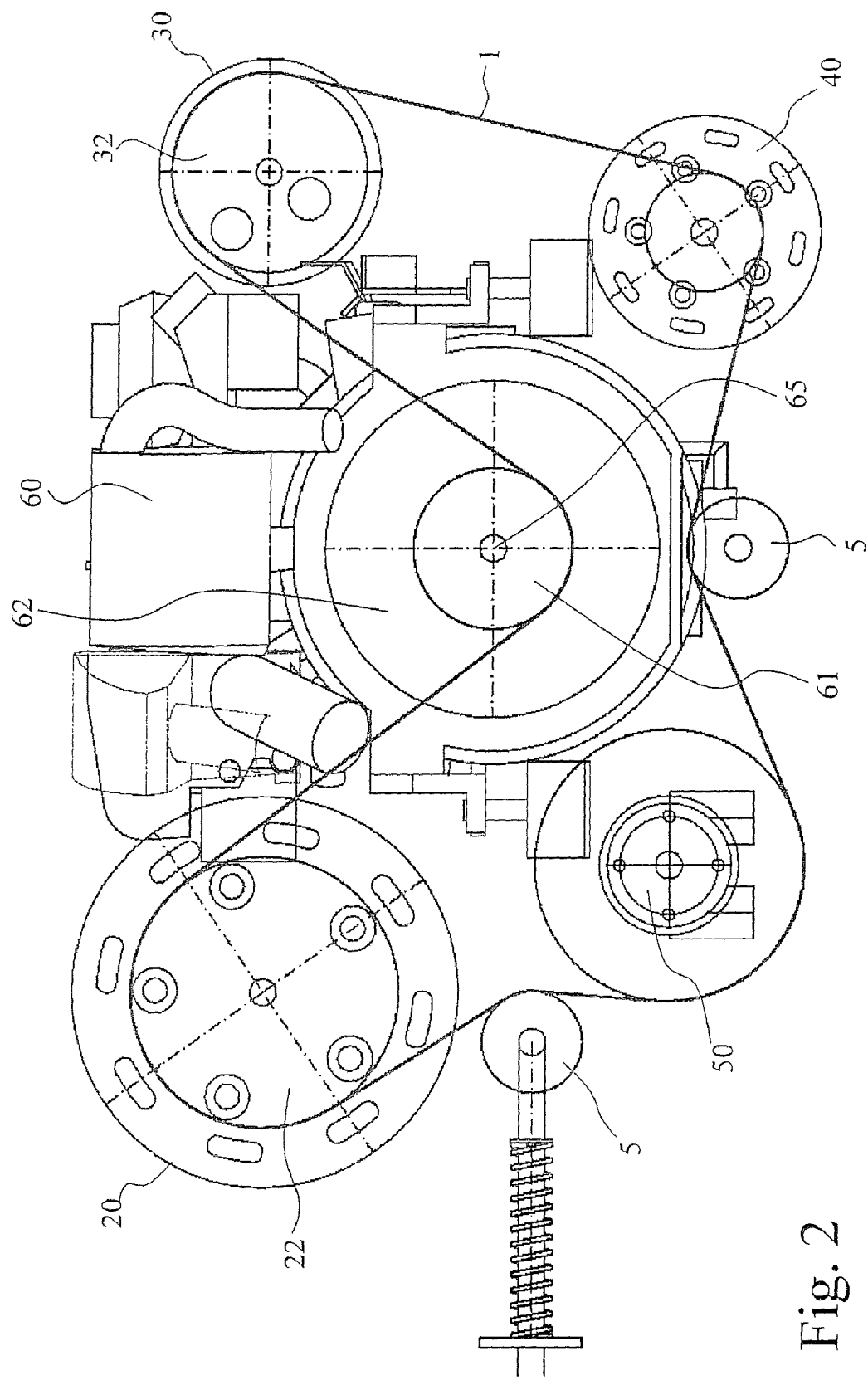
FIG. 2 shows a schematic view of the components of a power unit according to another possible embodiment, which provides for the use of a diesel-fuelled internal combustion engine.

FIG. 2 represents an embodiment of the power unit, which provides for the use of an internal combustion engine 60, of the diesel-fuelled type, intended for marine propulsion. All components common to the embodiment of FIG. 1 are indicated with the same reference numbers. Also in this case, the shaft 65 of the engine 60 is connected to the respective pulley 61 through a freewheel mechanism 62, and a same freewheel mechanism 22 is associated with the electric motor 20.

For all the embodiments of the present invention, the power unit provides for operation of the components by the internal combustion engine 10 or 60 during navigation, while when the boat is in port operation is implemented through the electric motor 20. When the unit is operated by the internal combustion engine 10 or 60, the freewheel mechanism 22 prevents the motor 20 from being driven in rotation. Likewise, the freewheel mechanisms 12 or 62 prevent the respective engines 10 or 60 from being driven in rotation when operation is entrusted to the electric motor 20. Alternatively to the freewheel mechanisms 12 and 62 present on the internal combustion engines 10 and 60, electromagnetically controlled clutches, such as that already provided for the compressor 30, can instead also be used.

In another more economical embodiment, the electric motor for operating the system when the boat is in port can be eliminated.

Figure 3:
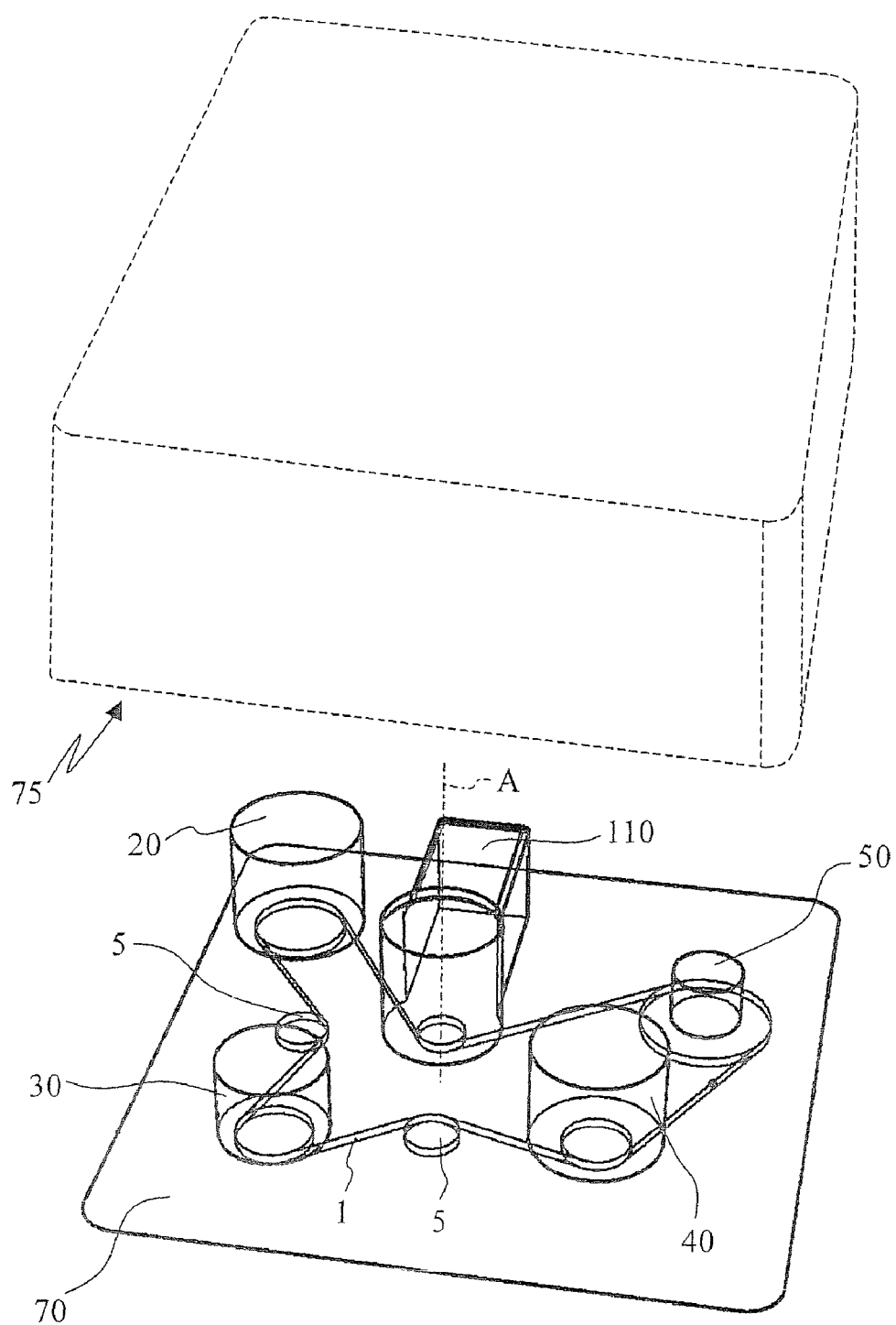
FIG. 3 is a schematic view showing the arrangement of the components on a flat support plate in the case in which an outboard propulsion engine is used, therefore with vertical motor axis.

FIG. 3 shows an embodiment in which the components of the units are mounted on a flat support plate 70. The internal combustion engine 110 is an engine for outboard propulsion, i.e. an engine that has a rotation axis A of the shaft disposed vertically. All the components of the unit are mounted on the plate 70 with rotation axis perpendicular to the plane of this plate, which is thus installed on the boat in a substantially horizontal position.

The components of the unit can, if necessary, be enclosed in a sound proofed casing 75 to form a "box" of which the plate 70 forms the bottom wall.

Figure 4:
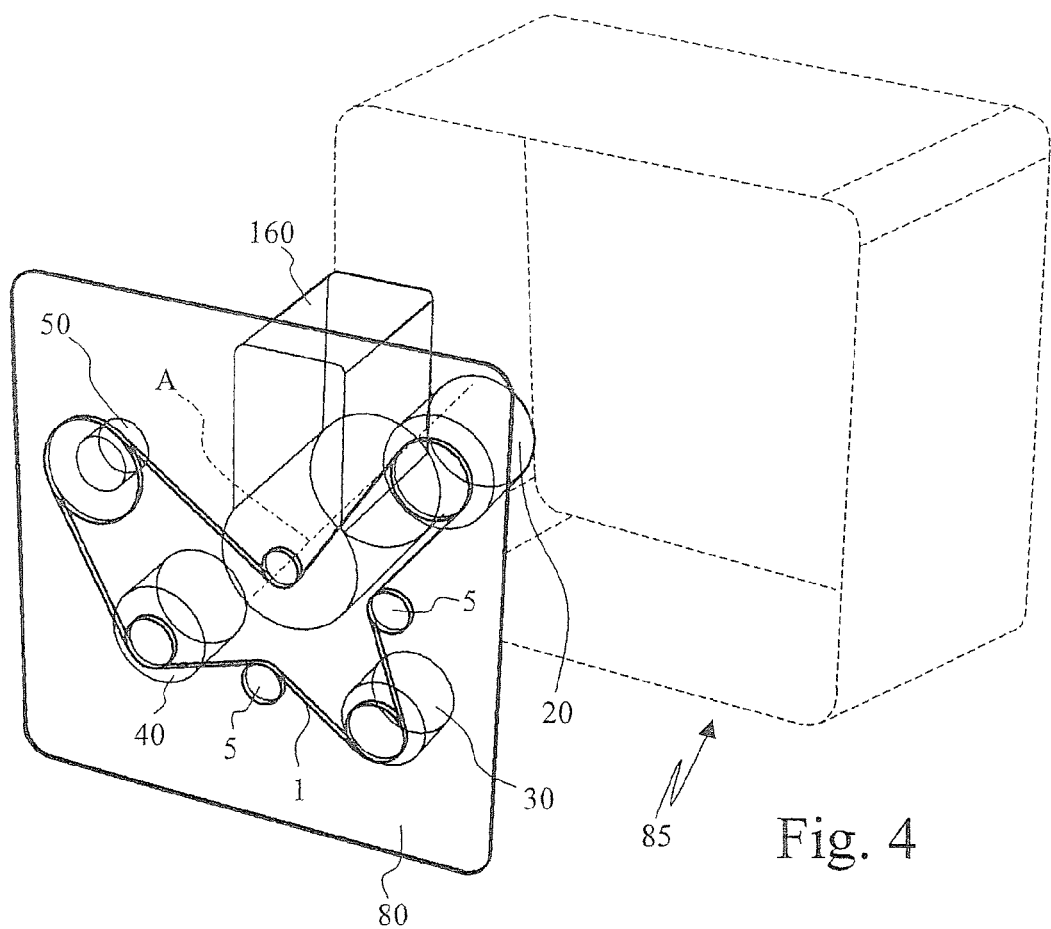
FIG. 4 is a schematic view showing the arrangement of the components on a flat support plate in the case in which an inboard propulsion engine is used, therefore with horizontal motor axis.

The power unit of the embodiment of FIG. 4 instead provides for the use of an internal combustion engine 160 for inboard propulsion with rotation axis A disposed horizontally.

The engine 160 and the other components of the unit are mounted on the plate 80 with the rotation axis perpendicular to the plane of this plate, which is thus installed on the boat in substantially vertical position. Also in this case, the components of the unit can, if necessary, be enclosed in a sound proofed casing 85 to form a "box" of which the plate 80 forms a sidewall.

Figure 5:
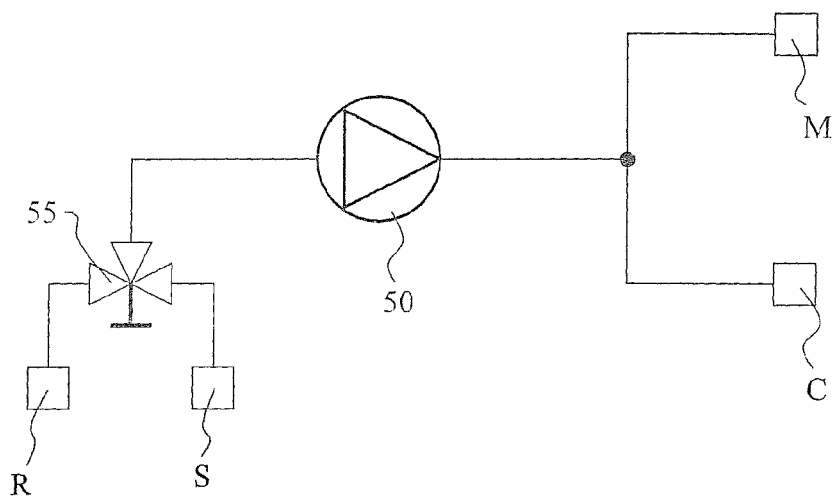
FIG. 5 schematically shows the pump associated with the power unit and any suction and delivery branches for performing the various functions.

FIG. 5 schematically shows a mechanical pump 50 belonging to the power unit according to the present invention and a three way valve 55 (or cock) placed along the suction circuit of this pump.

In a first position of the three way valve 55, the pump 50 draws from a water intake S which passes through the hull, as occurs normally, while in a second position of the three way valve 55 the pump can draw water from a suction intake R for example located in the engine room (or also from another compartment or room, depending on installation of the system) and thus be used as emergency bilge pump.

The water drawn is sent from the pump 50 toward a circuit M intended to cool the engine and toward a circuit C for cooling the coolant gas in countercurrent. The water is ejected from the same exhaust pipe as the exhaust gases, after having been mixed with these, to further deaden the noise generated by the internal combustion engine.

Figure 6:
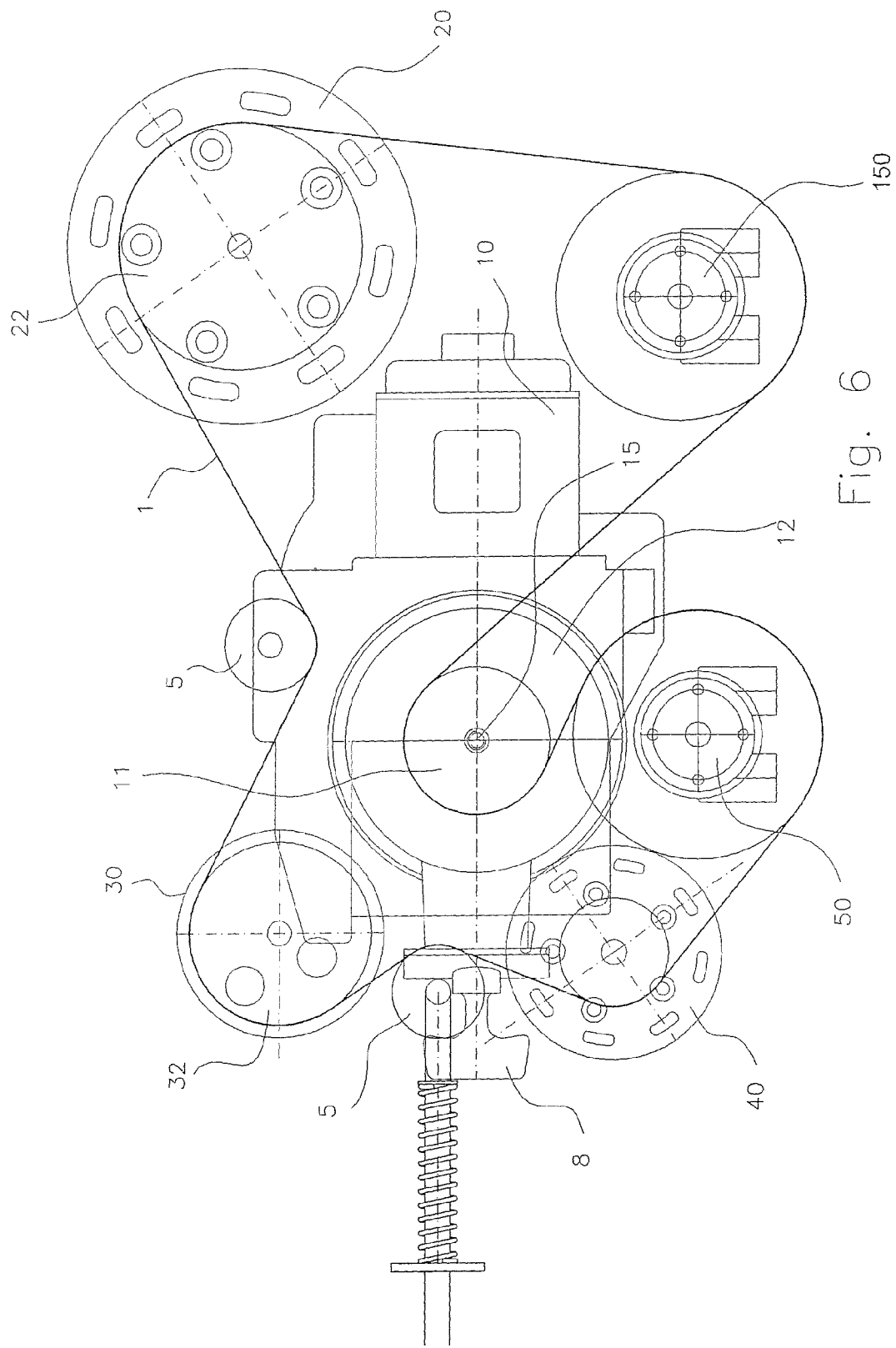
FIG. 6 is a schematic view of another embodiment of a power unit similar to that of FIG. 1, in which a pump has been added for circulation of treated water in a closed circuit.
Figure 7:
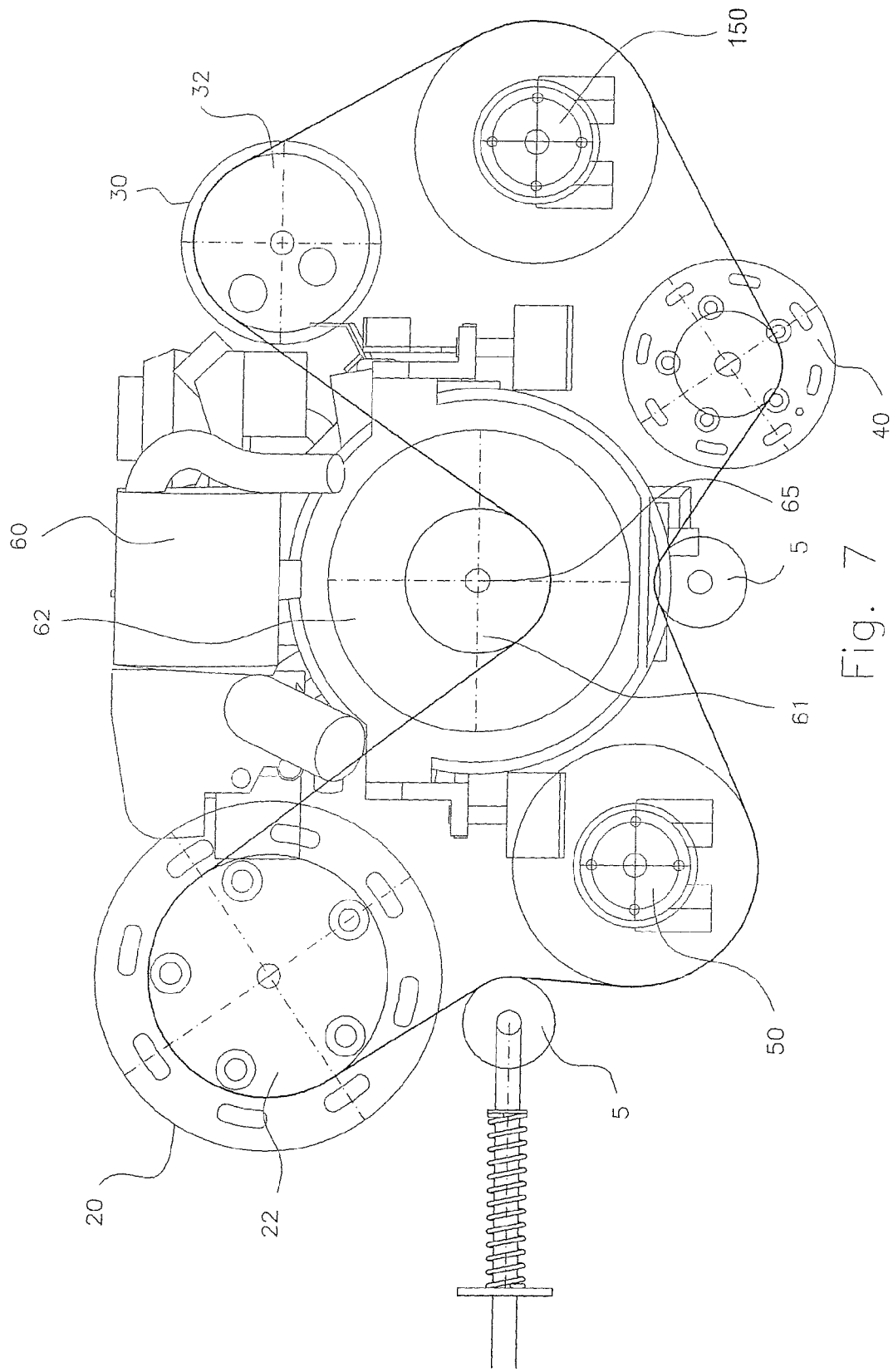
FIG. 7 is a schematic view of a further embodiment of a power unit similar to that of FIG. 2, in which a pump has been added for circulation of treated water in a closed circuit.

FIGS. 6 and 7 respectively represent alternative embodiments to those already shown with reference to FIGS. 1 and 2 respectively. In these embodiments a further pump 150 is provided for circulation of treated water, for example distilled water with additives, in a closed circuit.

Figure 8:
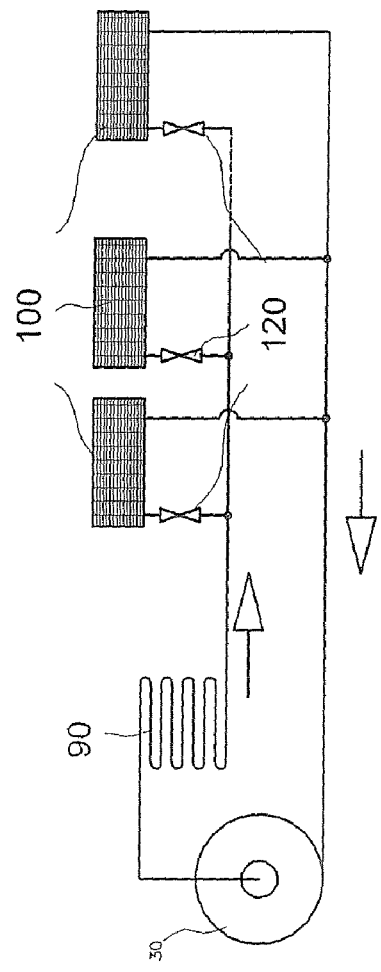
FIG. 8 shows a diagram of an air conditioning system with circulation of coolant gas sent directly to the fan coils.

In fact, the embodiments of FIGS. 1 and 2 can be utilized in a system such as that shown schematically in FIG. 8, in which the coolant fluid pressurized by the compressor 30 passes through a condenser 90 and then to the fan coils 100 each equipped with its own throttling valve 120. The coolant gas delivered from the fan coils 100 is then returned toward the compressor 30.

Figure 9:
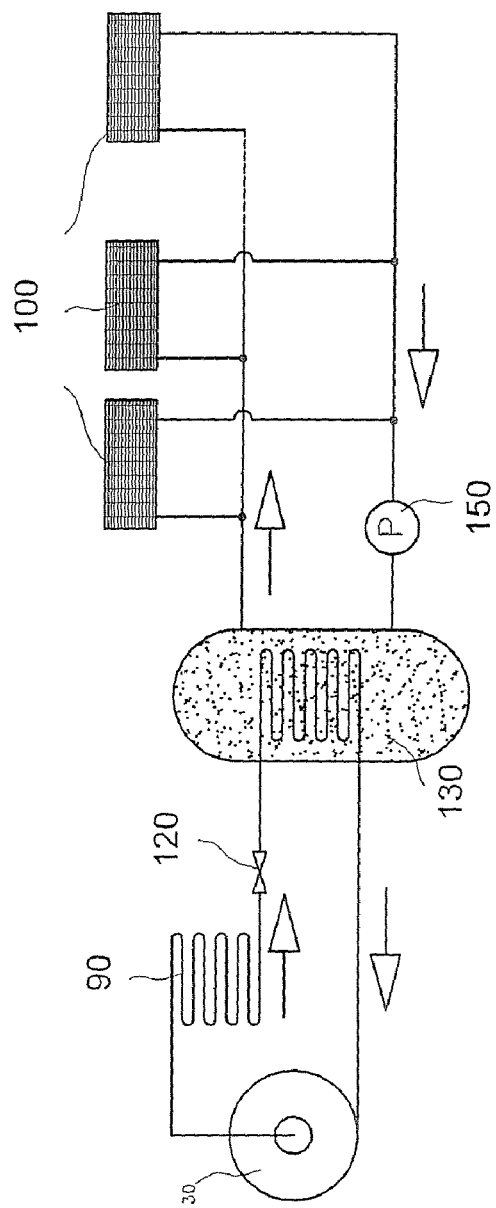
FIG. 9 shows a diagram of an air conditioning system with circulation of treated water previously cooled and then sent to the fan coils.

In the system diagram of FIG. 9, the fan coils 100 are instead connected in a closed circuit where the treated water present in the circuit is circulated by the pump 150, which is part of the power unit represented in FIGS. 6 and 7. The treated water is first cooled in a countercurrent heat exchanger 130, in which it is placed in heat exchange relation with the coolant gas circuit.

Various modifications can be made to the embodiments represented here without departing from the scope of the present invention. For example, in place of the alternator 40 and of the electric motor 20, a rotating electrical machine of reversible type can be used, i.e. a machine capable of operating as generator when it is driven in rotation, or as motor when it is electrically powered.

What is claimed is:

1. A power unit for air conditioning systems installed on boats, comprising at least one drive motor and means for driving the following components in rotation: at least one compressor connected to the circuit of a refrigeration device; at least one mechanical pump for circulation of a heat exchange fluid along an open circuit; and one or more rotating electrical machines, said at least one drive motor being an internal combustion engine with a four stroke cycle for marine propulsion, and at least one flat support plate for said components, said components being mounted with rotation axes of respective shafts disposed perpendicular to said flat support plate.

2. The power unit as claimed in claim 1, wherein said drive motor is a gasoline-fuelled engine of the outboard type with vertical motor axis.

3. The power unit as claimed in claim 1, wherein said drive motor is a diesel engine of the outboard type with vertical motor axis.

4. The power unit as claimed in claim 1, wherein said drive motor is a marine gasoline-fuelled engine with horizontal motor axis.

5. The power unit as claimed in claim 1, wherein said drive motor is a diesel engine of the inboard-outboard type with horizontal motor axis.

6. The power unit as claimed in claim 1, wherein at least one mechanical pump is also provided for circulation of a heat carrier fluid along a closed circuit.

7. The power unit as claimed in claim 1, wherein said heat exchange fluid is water.

8. The power unit as claimed in claim 1, wherein said one or more rotating electrical machines include at least one alternator.

9. The power unit as claimed in claim 1, wherein said one or more rotating electrical machines include at least one motor.

10. The power unit as claimed in claim 1, wherein said one or more rotating electrical machines include a reversible type machine which can operate as an electric motor or as an electrical current generator.

11. The power unit as claimed in claim 1, wherein said motion transmission means include one or more drive belts, stretched between the pulleys connected to said drive motor, to said at least one compressor, to said at least one mechanical pump and to said one or more rotating electrical machines.

12. The power unit as claimed in claim 1, wherein said motion transmission means include an electromagnetically controlled clutch connected to the shaft of said internal combustion engine.

13. The power unit as claimed in claim 1, wherein said motion transmission means include a freewheel mechanism connected to the shaft of said internal combustion engine.

14. The power unit as claimed in claim 1, wherein said motion transmission means include a freewheel mechanism connected to the shaft of one or more of said rotating electrical machines.

15. The power unit as claimed in claim 1, wherein said internal combustion engine includes manually operable starting means.

16. The power unit as claimed in claim 1, also including at least one three way valve along the open circuit.

17. A power unit for air conditioning systems installed on boats, comprising at least one drive motor and means for driving the following components in rotation: at least one compressor connected to the circuit of a refrigeration device; at least one mechanical pump for circulation of a heat exchange fluid along an open circuit; and one or more rotating electrical machines, said at least one drive motor being an internal combustion engine with a four stroke cycle for marine propulsion; and at least one three way valve along the suction open circuit of said mechanical pump.

* * * * *